Dec. 7, 1954 R. B. BLACK 2,696,049
METHOD OF AND APPARATUS FOR CUTTING TOOTH STRUCTURE
BY MEANS OF AN ABRASIVE-LADEN STREAM OF GAS
Filed Feb. 24, 1949 2 Sheets-Sheet 1
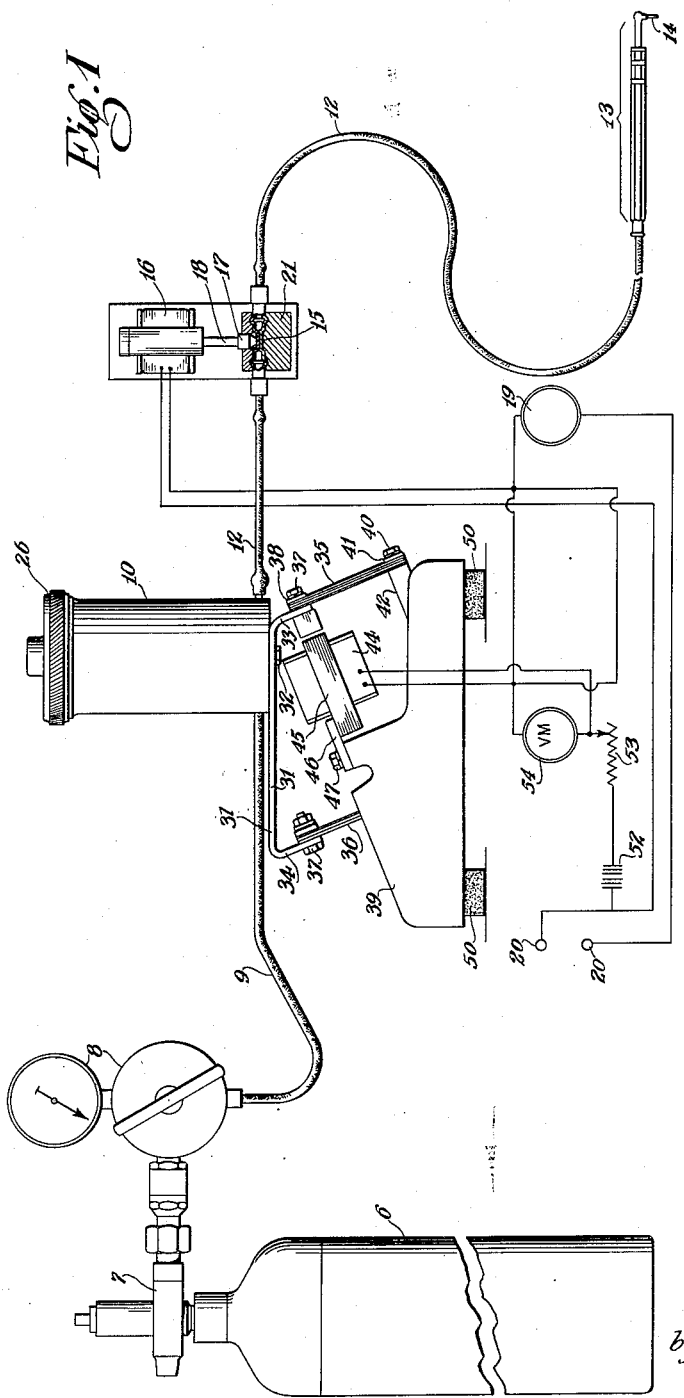
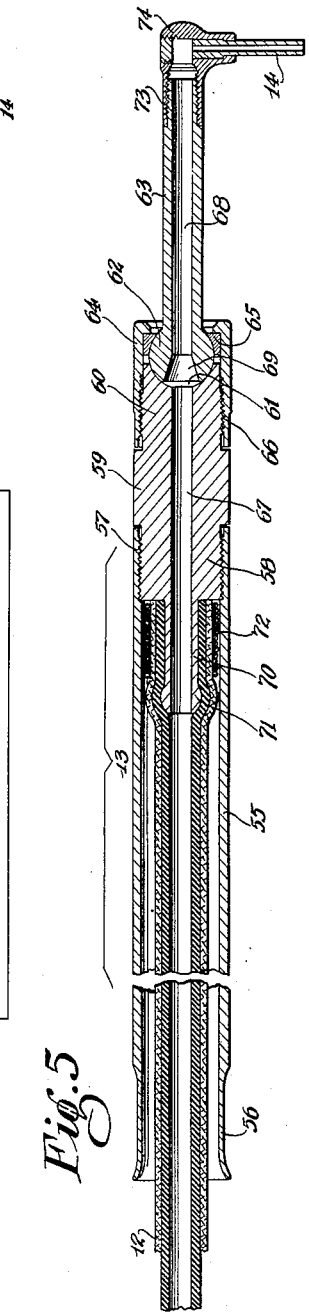
Inventor
Robert B. Black.
by Synnestvedt & Lechner Dec. 7, 1954  R. B. BLACK  2,696,049
METHOD OF AND APPARATUS FOR CUTTING TOOTH STRUCTURE
BY MEANS OF AN ABRASIVE-LADEN STREAM OF GAS
Filed Feb. 24, 1949  2 Sheets-Sheet 2
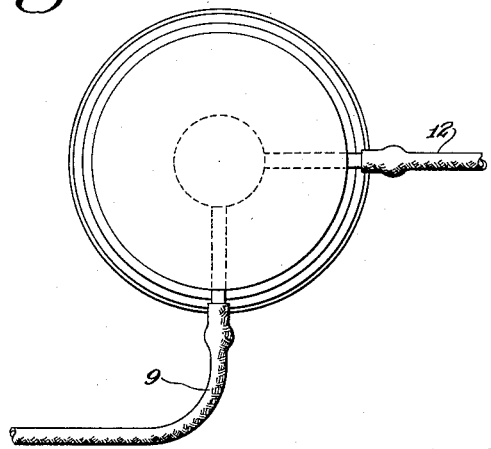
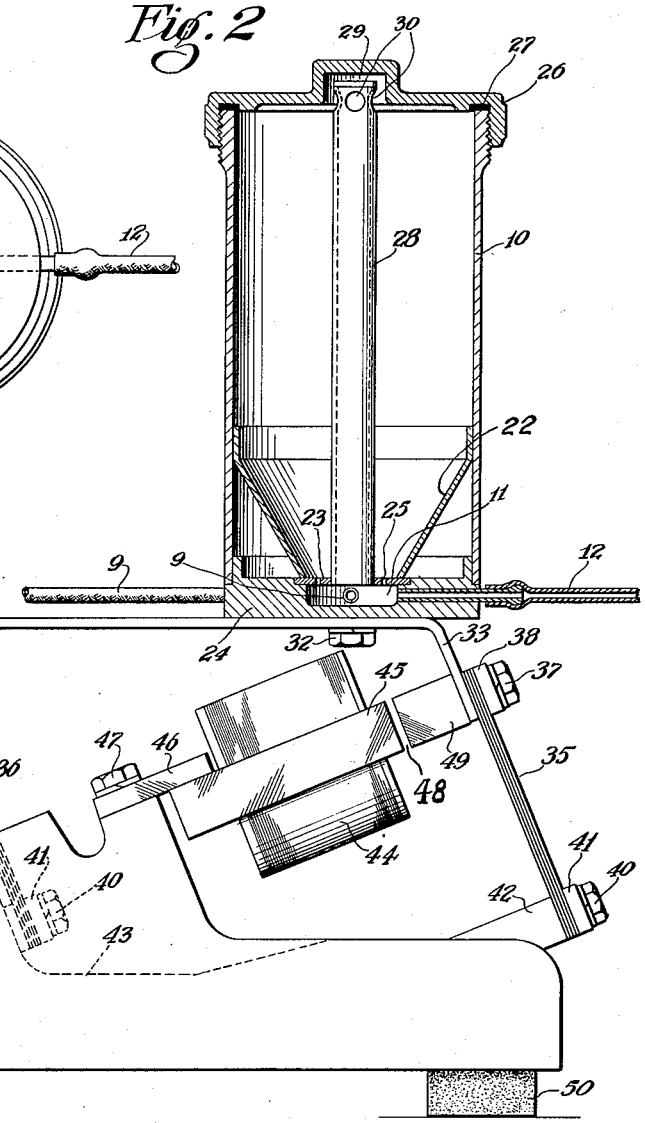
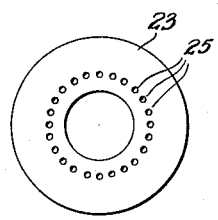
Inventor
Robert B. Black
by Synnestvedt & Lechner

United States Patent Office 2,696,049
Patented Dec. 7, 1954

2,696,049

METHOD OF AND APPARATUS FOR CUTTING TOOTH STRUCTURE BY MEANS OF AN ABRASIVE-LADEN STREAM OF GAS

Robert B. Black, Corpus Christi, Tex.

Application February 24, 1949, Serial No. 78,068

23 Claims. (Cl. 32—58)

This invention relates to the art of dentistry and is particularly concerned with the provision of improved means for cutting tooth structure by using an abrasive-laden stream of gas as distinguished from the familiar mechanically driven bur and it involves both method and apparatus.

As is well known, the ordinary mechanically driven bur which comes into direct contact with the tooth gives rise to annoying vibrations and the development of heat, the latter being considered by dental authorities to be particularly detrimental and sometimes even destructive to the nerve and blood supply to the tooth. In addition vibration and heat generally subject the patient to a considerable degree of pain so that dental work is always faced with more or less apprehension. Therefore, the principal object of my invention is to provide a substitute for the customary bur by means of which all vibration and heat and, therefore, substantially all pain are eliminated from the operation of preparing dental cavities.

Other broad aspects of the invention contemplate the provision of a method and an apparatus of the character described by means of which the time involved in preparing a cavity is materially reduced and shock to the nerve of the tooth is largely if not completely eliminated which latter, of course, is a factor of great importance in preserving the vitality of a tooth.

The invention also makes possible the avoidance to a large extent of the need for local anesthesia, the use of which often involves an inadvertent injury to the vitality of a tooth because the deadening effect of the anesthetic reduces the patient's sensitiveness to pain to such a degree as to eliminate the safeguard inherent in his normal reactions to the drilling operation.

The invention also contemplates certain other and somewhat more specific objectives such, for example, as are involved in the proper correlation of the factors of gas pressure, nozzle area, size of the abrasive particles, number of particles per unit of gas and velocity of the stream. Such correlation in the manner to be hereinafter fully described makes possible not only a material reduction in the time necessary to prepare a cavity, but also a greatly minimized wear on the nozzle, the avoidance of obscuring the vision of the operator, and the practicability of substantially complete recovery of the spent abrasive with its consequent elimination of dust in the room. The invention also provides for definite uniformity as well as for flexible and ready adjustability in the quantity of abrasive which is fed into the stream of pressure gas, and, in general, renders the use of an abrasive-laden stream of gas a completely practicable method of preparing dental cavities.

I will now describe a preferred method and apparatus by means of which the foregoing objects, together with such other objects as may appear hereinafter or are incident to my invention, may be attained and in connection with the description reference will be made to the accompanying drawings wherein Figure 1 is a schematic layout of a system and apparatus for the practice of my invention;

Figure 2 is partly a side elevation and partly a vertical section illustrating certain features relating particularly to the means which I employ for feeding the abrasive into the stream of gas;

Figure 3 is a bottom plan view of the container for the abrasive shown in Figure 2;

Figure 4 is a plan view of the orifice plate through which the abrasive particles are delivered from the hopper in which they are held to the chamber in which they are mixed with the pressure gas; and Figure 5 is a longitudinal section through a preferred embodiment of a handpiece and nozzle suitable for use with my invention.

The apparatus illustrated in the drawings will be described first. It includes a cylinder or source 6 of high pressure gas such, for example, as carbon dioxide which is inert and non-toxic and which I have found to be particularly useful in attaining the objectives of my invention. However, other gases under pressure can be employed and the invention in its broader aspects is not to be limited to the use of this particular gas.

The gas leaves the cylinder 6 by way of a suitable fixture 7 and passes through a pressure regulator 8. From the pressure regulator 8 it flows through a conduit 9 which may be of suitably flexible construction where needed as, for example, to take care of the vibration of the container 10 (see below) in which is stored the abrasive material. The conduit 9 enters the bottom of the container 10 to deliver to a mixing chamber 11 where the abrasive is mixed with the gas. The mixture then leaves the container through another length of conduit 12 which also may be flexible where needed and it will be noted that the incoming conduit 9 and the outgoing conduit 12 are arranged at right angles with respect to each other, the outlet to the latter, preferably, being located at a slightly higher elevation on the mixing chamber wall. These structural features and especially the change in direction as between the incoming gas and the outgoing mixture all cooperate in producing a great degree of turbulence in the mixing chamber 11 which is sufficient to cause all of the powder-like particles of the abrasive delivered to the mixing chamber to be entrained and carried along in the gas.

The conduit 12 is extended to the handpiece or tool 13 which has a terminal discharge nozzle 14 from which the stream of abrasive-laden gas is finally discharged in the form of a very fine jet. The details of this handpiece will be described below.

In the conduit 12 I provide a suitable valve for controlling the flow of the mixture. In the present embodiment this valve takes the form of a pinch valve 15 which is normally spring-held in position to close the conduit as shown in the schematic layout of Figure 1. This valve can be opened by means of the solenoid 16, the coil of which is energized to lift the pinch piece 17 carried by the end of the armature 18 when the foot switch 19 is moved to close the circuit for the current through the electrical supply lines 20. The pinch piece 17 reciprocates in a block 21 through which passes a flexible section of the conduit 12 arranged in alignment with the lower end of the pinch piece so that the passage through the conduit can be shut off by the simple expedient of squeezing in the walls of the conduit as clearly shown in the figure.

By referring particularly to Figure 2 it will be seen that the container 10 for the abrasive is provided with a conical or hopper-like bottom 22 which directs the abrasive against the upper face of an orifice plate 23 fitted against a suitable flange in the container base plate 24, said orifice plate acting as a cover member for the mixing chamber 11.

The orifice plate is perforated with an annularly arranged series of small holes 25, the number and size of which, when the device is inoperative, do not permit the powdery abrasive to fall through into the mixing chamber 11. In the embodiment illustrated it was found that a series of twenty-four holes each having a diameter of .021 of an inch gave very satisfactory results.

The container 10 is airtight and is sealed at the top by means of a cover or cap plate 26 which may be threaded or otherwise secured against a cooperating gasket 27.

The gas which comes in through the conduit 9 is under considerable pressure as will appear more fully below and in order to equalize this pressure throughout the container and the mixing chamber as quickly as possible I provide an upwardly extending balancing tube 28 which projects into an enlarged recess 29 in the under face of the screw cap 26. The upper end of the tube 28 is preferably closed so as to prevent the abrasive powder from inadvertently falling down into the balancing tube during the filling operation when the cover 26 is removed. Lateral openings 30 near the top of the tube provide for passage of the gas from the interior of the tube to the interior of the container 10 at a point above the level of the abrasive which level, of course, will vary depending upon the quantity of abrasive in the container. The area of the balancing tube 28 is made many times that of the outlet pipe 12 so that the pressure in the mixing chamber 11 and in the space in the container 10 above the abrasive is at all times so nearly equalized that the rate of feeding abrasive into the mixing chamber is not affected.

The lower end of the balancing tube fits snugly into a cooperating central aperture in the orifice plate 23 within the circle of the annular series of perforations 25. This is clearly shown in Figure 2 of the drawings. The inside diameter of the balancing tube may be .438 of an inch, which diameter, I have found by experience, yields excellent results although, obviously, this can vary over a considerable range. The factor which is of importance is that it should be much greater in area than the area of the outlet conduit 12 so as to permit a quick build-up of pressure in the container 10 after the gas pressure is turned on. In this way it effects and maintains a balance of pressure between the container 10 and the mixing chamber 11 without disturbing the condition of the abrasive powder at the orifice plate 23.

Incidentally, I wish to point out that the mixture of gas and abrasive does not discharge directly into the air but must pass through the conduit 12 which is of relatively small diameter (.06 of an inch by way of example) to the nozzle 14 which has an even smaller inside diameter as will further appear. In the absence of the balancing tube this would lead to an unstable condition, especially when the gas pressure is first turned on, and would tend to result in uneven spurts of abrasive powder being forced into the mixing chamber 11, thus causing intermittent and unsatisfactory operation.

The mechanism by which the abrasive particles are fed into the stream of gas will now be described. The abrasive container 10 is clamped firmly to a horizontal supporting platform 31 as by bolts 32 which project upwardly through the platform into the base plate 24. At its ends the platform is provided with the downwardly extending flanges 33 and 34 which are secured, respectively, to the leaf springs 35 and 36 by means of suitable clamping bolts 37 and clamping bars 38. At their lower ends the springs are similarly clamped to a heavy cast iron base 39 by means of the clamping bolts 40 and the clamping bars 41, the spring 35 being fastened to the extension piece 42 and the spring 36 being fastened to the wall of a pocket 43 all as clearly shown in Figure 2. As will be seen, the springs 35 and 36 are arranged at an angle of approximately 20° with respect to the vertical. However, this angle can vary somewhat although experience has shown that an angle of 20° gives very good results.

An electromagnet 44 having a core 45 is rigidly affixed to the base 39 by means of a clamping plate 46 and bolts 47, the plate being adjustable to permit adjustment in the width of the air gap 48 between the core 45 and the armature 49, the latter being secured to the flange 33 at a point just in back of the clamping bar 38, being held in place in any suitable manner, as by extending the bolts 37 into properly threaded holes in the armature.

The base 39 carrying the equipment just described is provided with rubber supporting pads or feet 50 or other cushioning means.

Current for actuating the electromagnet is supplied from any convenient source such as the 110 volt 60 cycle circuit 20 in which circuit a selenium rectifier 52 is inserted. By suppressing one-half of the wave form in this manner, the current is converted into a pulsating current which results in halving the number of magnetic impulses so that for a 60 cycle supply line this would mean 3600 impulses per minute instead of 7200. The voltage across the coil 44 can be regulated by means of the series rheostat 53 and this voltage can be read by connecting a volt meter 54 across the line.

It will now be seen that when the circuit is closed, the table or platform 31 carrying the container 10, will be vibrated and that the motion imparted will have both a vertical and a horizontal component. It should be noted in this connection that the angle between the magnet core 45 and the horizontal platform 31 is the same as the angle between the springs 35 and the vertical—namely, 20°. In operation, therefore, the electromagnet pulls the platform downwardly and backwardly and then the springs 35 and 36 return it upwardly and forwardly. This motion causes the abrasive powder in the container 10 to be fed into the mixing chamber 11 through the apertures 25, the motion being such as will tend to permit the powder to fall perpendicularly as the platform is pulled backwardly and downwardly. Then as the springs 35 and 36 return the platform upwardly and forwardly, the tendency would be to carry the powder with it. This causes the abrasive particles which are lying on the orifice plate 23 to pass over the orifices 25 and since the powder is smaller in size than the diameter of the openings, there will be a steady feeding of particles through the openings into the mixing chamber 11 where they will be entrained in the gas stream and discharged into the conduit 12. The gas swirls through the mixing chamber picking up the powder on its way as long as the vibration is continued. However, as soon as the vibration stops, the feed of abrasive particles into the mixing chamber also stops even though gas may still flow therethrough.

All of the particles on the orifice plate 23 will not pass through the orifice but some of them will tend to continue their travel under the influence of the motion already described and they will even climb or attempt to climb up the inclined surface of the hopper 22. The result is to keep the particles in a constant state of movement or flux and they follow a very regular or definite pattern of circulatory motion both vertically and horizontally by means of which motion it is possible to secure a completely controlled flow of powder through the orifice plate 23. Furthermore, by changing the amplitude of vibration, the quantity of powder which is delivered to the mixing chamber can readily be altered or varied.

By the arrangement described, the flow of abrasive powder into the gas stream may be plotted against the voltage on the volt meter so that the actual flow of particles can be known from any given voltage reading. It is even possible, if desired, to calibrate the volt meter scale directly in unit weight or volume of abrasive powder per unit of time.

It should be stated that any such calibration is accurate for its given vibrating system. For example, if any of the variables are changed, such as the air gap, the size and number of the orifices, or the type or particle size of the abrasive powder—a somewhat different calibration curve can be expected. This, however, can be determined quite readily by simple experimentation and within the limits given below has substantially no or very little effect upon the operation of my process.

It should also be noted, and this is somewhat surprising, that, for a given magnet voltage, the vibrating system just described will deliver a substantially uniform flow of abrasive powder regardless of the height of the abrasive powder level in the cylindrical section of the container 10.

I wish to call attention at this time to the fact that the circuit for the solenoid 16 which operates the pinch valve 15 as well as the circuit for the electromagnet 44 which operates the vibrator are both actuated when the foot switch 19 is closed. It is preferable to operate these two devices simultaneously so that the abrasive is fed to the gas only at times when the line 12 leading to the handpiece 13 is open. In this way there will be no build-up of abrasive in the mixing chamber 11 which would cause unevenness in the mixture delivered from the nozzle 14. Such a condition would be temporary and would do no particular harm, but uniformity and smoothness of operation are desirable and this can be secured by simultaneously opening the pinch valve 15 and vibrating the mixing device.

The handpiece 13 includes a tubular handle part 55 having a belled end 56 through which enters the flexible conduit 12. At the other end the handle portion 55 is internally threaded as at 57 to receive an externally threaded portion 58 at the rear of the connecting piece 59. The forward portion 60 of the connecting piece has a concave socket portion 61 which cooperates with the ball 62 of the hollow arm 63. The ball is held in place by the flanged sleeve 64, there being suitable packing 65 between the flange and the ball which packing can be tightened against the ball by screwing up the sleeve 64. For this purpose the reduced portion 60 and the interior of the sleeve 64 are provided with cooperating threads 66.

Interiorly the connecting piece 59 is formed with a suitable bore 67 in alignment with the bore 68 in the hollow arm 63. Within the ball 62 of the hollow arm the bore 68 is flared as at 69 in order to permit swinging movement of the arm 63 without encroaching on the cross-sectional area available for carrying the stream of the mixed gas and abrasive.

At the rear the piece 59 is provided with a reduced extension 70 having a terminal enlargement 71. The end of the flexible tube 12 is expanded over this extension and is then suitably wrapped with wire 72 in order to make a tight joint.

At the outer end the hollow arm is externally threaded as at 73 to cooperate with corresponding threads on the interior of the elbow 74 which carries the nozzle 14.

In connection with the apparatus as so far described, certain other factors must be considered in order to fully realize all of the advantages incident to my invention. For instance, after much careful investigation and experimental work I have found that there is a more or less ideal relationship which should exist between the pressure of the gas employed, the size of the discharge nozzle, the size and character of the particles of abrasive, the number of abrasive particles per unit of gas and the velocity of the discharging stream. These factors will now be fully discussed.

To begin with, the abrasive, preferably, should have a hardness of from 7 to 9 inclusive on Mohs' scale. Aluminum oxide falls within this range having a hardness of about 9 on said scale and I prefer to use aluminum oxide because of its non-toxic character and ready availability. Other abrasives which can be used are silicon carbide or silicon dioxide but I do not favor them because of the danger of silicosis.

For best results it is important that the abrasive be manufactured so that the individual particles have sharp edges and points rather than relatively smooth or rounded surfaces. This is necessary in order to insure proper and relatively rapid cutting of the tooth structure.

The size of the individual particles is also of considerable importance in attaining the best results and my work to date indicates that an abrasive in which the bulk of the particles varies from about 10 to 44 microns has given excellent and completely satisfactory results with a range of from 20 to 30 microns yielding results which, under some conditions, at least, are probably superior. In this connection it should be explained that after the stream of gas and abrasive has performed its function on the tooth of the patient it is highly desirable to separate the particles of abrasive from the air and to collect them so that they do not form a dust in the dentist's office. I have developed suitable suction apparatus for this purpose which I have not illustrated in the present application because it constitutes a separate invention to be disclosed and claimed in a copending application. Suffice it to say that in order to effectively collect the particles of spent abrasive after they have performed their function in excavating a cavity, I have found that the individual particles of abrasive should not be smaller than approximately 10 microns nor larger than approximately 44 microns as above stated. If the particles fall below the size indicated it is extremely difficult if not impossible to completely separate them from the air and confine them in a dust collector and, if they are too large, they are also very difficult to pick up when they issue from the mouth of the patient because the weight of a larger particle makes it more difficult to retrieve it by means of a suction apparatus.

Additionally, if any large percentage of the particles of abrasive fall outside the range given above, other difficulties develop. For instance, if the particles are too small, they tend to cause an appreciable sensation of pain when cutting the structure of the tooth and, if they are too large, they tend to sting the patient when they hit the soft tissues of the mouth as will sometimes happen if the mixed stream of gas and abrasive should be directed momentarily against such tissue or when the particles rebound from the tooth. Even with the greatest of care in directing the stream of abrasive this will occasionally occur. However, within the size range given, experience has shown that the patient is in no way discomforted should the particles of abrasive strike the soft tissues of the mouth. It should also be noted that beyond the upper limit of the size range given, the particles are too crude or coarse in their cutting action.

The next factor which I wish to consider is the size of the opening in the nozzle 14. In the first place, this nozzle, of course, must be made of extremely abrasive-resistant material in order to adequately withstand the abrasive action of the dust. A number of materials are available for this purpose such, for example, as sapphire, boron carbide, silicon carbide, tungsten carbide and sintered carbides of tungsten, titanium, tantalum and columbium, but of these I prefer sintered or cemented tungsten carbide.

In a nozzle having a circular discharge opening, after much experimental work, I have discovered that best results are secured by using a nozzle having a diameter which lies between 0.014" and 0.025". Expressed in terms of area this means a nozzle having an opening of from fifteen hundred-thousandths to forty-nine hundred-thousandths of a square inch. A preferred range for most operating conditions is a nozzle having a bore of from 0.015" to 0.02" diameter.

If the nozzle opening is too small, the cutting area will be too restricted and more time will be required to do a given job. Also, the smaller the nozzle opening the more likely it is to become clogged. Furthermore, with an opening which is too small the flow of gas therethrough is liable to be at a rate which is not sufficient to insure satisfactory mixing of the abrasive with the gas in the chamber 11. On the other hand, if the nozzle is too large, it is impossible to provide for the other factors which are of importance in attaining satisfactory operation, some of which factors have been mentioned above and others of which will be discussed below.

A word should also be said about the length of the nozzle. There is nothing exceptionally critical about this factor and I have secured good results over a range of from 1/8" to 1/2" although for a large percentage of cutting work I have found that a nozzle length of from 1/4" to 3/8" gives the most satisfactory results.

The number of abrasive particles per unit of gas employed is also a very important factor in fully realizing the advantages of my invention. For example, two few particles increases the time required to do the desired work. Too many particles per cubic inch of gas causes a reduction in the rate of the cutting action, most probably because of interference on the part of the particles rebounding from the tooth with the particles approaching the tooth. Also, too many particles will obscure the dentist's vision over the work area. With these and other factors in mind, after much experimentation, I have found that best results can be secured if the number of particles of abrasive which are fed to the stream of gas lies between $0.3 \times 10^6$ and $3.0 \times 10^6$ particles per cubic inch of gas. The maximum number of particles which may be fed into a patient's mouth without seriously interfering with the vision of the dentist is approximately $3 \times 10^7$ per second. All references to volume of gas are based on measures taken with gas at atmospheric pressure.

When dealing with particles which are as small as those here involved, it is, of course, extremely difficult to measure their number, especially where the abrasive employed may show a considerable variation in particle size. Therefore, any calculation in this regard, at best, is bound to be somewhat of an approximation. However, in setting the limits which I have given above, the following method of calculation may be employed and will yield results which may be depended upon in attaining the objects of my invention.

The first thing to consider, of course, is the particle size distribution in the abrasive employed because in preparing abrasives as fine as those which are necessary for use with my invention, it is impossible to maintain absolute uniformity as to size. For example, a series of aluminum oxide powders of 400 mesh may show considerable variation in particle size distribution. This may be determined by using water elutriation and calculating the particle size by employing Stokes' law. The number of particles per unit of time may then be calculated by multiplying the weight of the particles used per unit of time by the number of particles per unit of weight. Dividing the product so obtained by the number of cubic inches of gas at atmospheric pressure used per unit of time will give a sufficiently accurate approximation of the number of particles used per cubic inch of gas to effectively carry out my invention.

In connection with the number of particles employed a question might arise as to whether or not it would be somewhat simpler to define this in terms of particles per unit of time. However, I have found that to express this factor in terms of the number of particles employed per cubic inch of gas gives a measure which is not dependent upon nozzle diameter.

The next factor which I wish to consider is the velocity of the stream. This is very difficult to measure but the following technique yields a figure which is definite for the purpose of practicing my invention. The volume of gas utilized, measured at atmospheric pressure, is divided by the area of the exit opening of the nozzle to give a calculated velocity and, by use of this formula, after much experimentation, I have found that this velocity should lie somewhere between twenty and one hundred thousand inches per second. Below twenty thousand inches per second the cutting rate is objectionally slow and above a velocity of approximately one hundred thousand inches per second, when employing the optimum number of abrasive particles as above described, the cutting rate is also reduced—again, probably because of interference between the particles. Also, at higher velocities wear on the nozzle as well as on other parts of the apparatus will be greater than at lower velocities.

Gas pressure, of course, is also a factor of importance but I have not found it to be as critical, for instance, as the number of particles per unit of gas and the velocity of the stream. In fact, the pressure as it is delivered to the line 9 from the pressure regulator 8 can vary over quite a wide range. However, for the conditions which are liable to be met in the average dentist's office I have found that a gas pressure ranging somewhere between 35 and 75 pounds per square inch at the regulator 8 can be employed to give the desired results and that most cutting work is probably best done at from 60 to 65 pounds' pressure. On the other hand, I have operated my method with pressures as high as close to 200 pounds per square inch but it is interesting to note in this connection that very little difference in the cutting rate is developed between approximately 75 pounds per square inch and 195 pounds per square inch, other factors, of course, remaining the same.

In connection with the matter of pressure, I wish to say that, while with most patients my method of cutting tooth structure is practically painless yet, I have sometimes found a patient whose teeth seem to be unusually sensitive. In such instances I find that a reduction in the pressure tends to reduce whatever little pain may be developed. However, below about 35 pounds' pressure at the regulator, the cutting rate falls rapidly to the point where the process becomes impractical.

All of the pressure figures given above are at the regulator 8 and it should be realized that there will be a small drop between the regulator and the nozzle. The drop, of course, will depend upon a number of factors such as the length of the conduit and the absorption in the mixer and in the pinch valve, but for the conditions in a dentist's office of average size, this drop in pressure between the regulator and the nozzle will probably be in the neighborhood of five pounds. With a little experience the dentist will quickly determine what pressure at the regulator will give best results for his particular situation but the above figures can be used as a guide and will yield excellent results.

I will now outline briefly the method of operation. The dentist will first determine the nature of the cutting which will be required and this, of course, is done in the usual ways familiar to those skilled in the art of dentistry. He will then set the rheostat for the volt meter 54 at a position which will give him the proper feed of abrasive for the contemplated work. He will also see that the gas pressure from the reservoir 6 is turned on and the pressure adjusted to that desired by means of the regulator 8, whereupon he will be ready to proceed with his work. He will hold the handpiece 13 in a position such as will properly direct the stream of gas and abrasive issuing from the nozzle 14 against that portion of the tooth structure which is to be cut away. When ready to proceed he will close the foot switch 19 which, as already described, will open the pinch valve 15 and set the vibrator into motion. The nozzle 14 will be held at such distance from the tooth as may be necessary to get the best results for the work in hand, and this can readily be determined after a little experience in using the instrument. Suffice it to say that the closer the nozzle is to the tooth, the more sharply and finely the area cut will be defined and the more nearly will its sides be parallel. When the nozzle is moved further away from the tooth, the tendency is for the stream to flare outwardly which, of course, will alter the cutting effect and change the slope of the walls of the cavity.

The operation will be continued until the necessary work is completed, the dentist closing and opening the switch 19 to start and stop the jet to meet his needs.

If the cutting action requires adjustment as the work progresses, the feed of abrasive can be varied quickly simply by adjusting the rheostat 53 to change the voltage across the vibrator, and the volt meter 54, of course, will reflect the change and give a reading which can be directly in terms of the feed or in voltage if so desired.

In connection with the feeding device, I wish to emphasize the exceedingly flexible character of its operation insofar as feed of the abrasive is concerned. The quantity of abrasive that is fed into the stream of pressure gas can be varied widely in the manner described and in all positions of adjustment the quantity fed is remarkably constant and this regardless of whether or not the container 10 may be nearly full or nearly empty of abrasive. This ability to vary the feed while at the same time maintaining uniformity of feed at any input level is one of the most important features of my invention and is especially noteworthy when it is realized that the weight of the container when full, is considerably more than when nearly empty. I might point out that in the apparatus with which I have done a great deal of my experimental work, the container 10 is approximately 6″ high and, when substantially filled with a particular aluminum oxide abrasive having characteristics which fall within the limits defined above, will weigh approximately 5.05 pounds, but when only one quarter full of the same abrasive will weigh only 3.835 pounds. Naturally this difference in weight as between a full container and a one-quarter full container introduces quite a difference in the mass to be vibrated and yet for any given voltage across the vibrator, the feed of abrasive into the stream of gas remains so nearly constant as to be truly remarkable. Naturally the amplitude of the vibration imparted will vary with different quantities of abrasive in the container 10 and I believe that it is this fact which compensates for the change in weight and makes it possible to maintain uniformity of feed for any given voltage.

By way of specific confirmation of the foregoing, I have very carefully and accurately measured the amplitude of vibration imparted to the container 10 and compared the amplitude when the container was full, with that when it was one-quarter full. The horizontal component was read at the level of the bottom of the base plate member 24 and the vertical component was measured at the top of the cup-shaped member on the cover 26 at the center thereof. For one type of abrasive when fed at a desired intermediate rate, the horizontal component of motion with the container 10 substantially full of abrasive was 0.015″. At the same time the vertical component was 0.005″ with the same abrasive, but with the container only one-quarter full the horizontal component was 0.017″ while the vertical component was 0.014″. These variations in the amplitude of the two components of motion as between a full container and a one-quarter full container were undoubtedly responsible for the fact that the feed was absolutely uniform and under both these conditions the number of particles fed was $1.85 \times 10^6$ per cubic inch of gas.

When the rate of feed was close to the minimum quantity of abrasive within the teachings given above (for example $0.36 \times 10^6$ particles per cubic inch of gas) the horizontal component of motion for a full container was 0.009″ and the vertical component was 0.001″ while the corresponding components for a one-quarter full container were respectively 0.010″ and 0.006″.

At the other extreme, namely, for a rate of feed where the mixture contained close to the maximum number of particles as described above (specifically $2.99 \times 10^6$ particles per cubic inch of gas) the horizontal component for the full container was 0.018″ and the vertical component 0.007″ while for a one-quarter full container the corresponding components were respectively 0.020" and 0.018".

I claim:
1. In the cutting of tooth structure by means of an abrasive-laden stream of gas, the method which consists in feeding a pulverized abrasive material into the gas at a rate lying between $0.3 \times 10^6$ to $3.0 \times 10^6$ particles per cubic inch of gas measured at atmospheric pressure and delivering the stream through a nozzle so as to yield a discharge velocity lying between 20,000 and 100,000 inches per second.

2. The method of claim 1 wherein the bulk of the abrasive has a particle size lying between 10 and 44 microns.

3. In the cutting of tooth structure by means of a jet of gas carrying a pulverized abrasive material, that method which consists in placing the mixture of gas and abrasive under pressure and then discharging it from a nozzle, feeding the abrasive material into the gas while under pressure at a rate lying between $0.3 \times 10^6$ to $3.0 \times 10^6$ particles per cubic inch of gas measured at atmospheric pressure, and correlating the pressure to the cross sectional area of the jet at the exit opening of the nozzle so as to yield a discharge velocity lying between 20,000 and 100,000 inches per second.

4. The method of claim 3 wherein the bulk of the abrasive has a particle size lying between 10 and 44 microns.

5. In apparatus for cutting tooth structure by means of an abrasive-laden jet of gas, the combination of a nozzle, a source of compressed gas, an air tight abrasive container having a storage compartment and a mixing chamber separated by a perforated plate, a conduit connecting the gas source with the nozzle, said conduit including the mixing chamber, means for delivering compressed gas to the storage compartment at a point above the level of the abrasive whereby to balance the pressure throughout the container, and means for vibrating the container to effect delivery of abrasive from the storage compartment to the mixing chamber through the perforations of said dividing plate.

6. Apparatus according to claim 5 wherein the vibration imparted to the container has both a vertical component and a horizontal component.

7. Apparatus according to claim 5 wherein means are provided for varying the amplitude of the vibration imparted to the container.

8. Apparatus according to claim 5 wherein the said conduit is provided with a controlling valve located at a point between the mixing chamber and the nozzle.

9. Apparatus according to claim 5 wherein the said conduit is provided with a controlling valve located at a point between the mixing chamber and the nozzle, together with means for vibrating the container and also with means for actuating the valve, said last two means being arranged to function simultaneously.

10. In apparatus for cutting tooth structure by means of an abrasive-laden stream of gas, the combination of a nozzle, a source of compressed gas, a conduit connecting the gas source with the nozzle, a valve for controlling the flow through the conduit, an abrasive container having a reservoir adapted to delivery into a relatively small capacity mixing chamber, said conduit being arranged to deliver the gas to said mixing chamber at one side thereof and to carry away the mixture from another side thereof, and means for vibrating the container.

11. Apparatus acccording to claim 10 wherein the motion imparted to the container has both a vertical and a horizontal component.

12. Apparatus according to claim 11 wherein means are provided for varying the amplitude of the vibration imparted to the container.

13. In apparatus for cutting tooth structure by means of an abrasive-laden stream of gas, the combination of a nozzle, a source of compressed gas, a conduit connecting the gas source with the nozzle, a valve for controlling the flow through the conduit, an abrasive container, a connection for delivering abrasive from the container to the conduit, and means for vibrating the container, together with means for actuating the valve and the vibrator simultaneously.

14. In apparatus for cutting tooth structure by means of an abrasive-laden stream of gas, the combination of a nozzle, a source of compressed gas, a conduit connecting the gas source with the nozzle, an abrasive container having a hopper with a mixing chamber therebelow, a plate between the hopper and the chamber having perforations which are sufficiently small to prevent the abrasive from falling therethrough when the container is at rest, said conduit being arranged to deliver the gas to said mixing chamber at one side thereof and to carry away the mixture from another side thereof, and means for vibrating the container to feed the abrasive through the perforations.

15. Apparatus according to claim 14 wherein the motion imparted to the container has both a vertical and a horizontal component.

16. Apparatus according to claim 14 wherein the motion imparted to the container has both a vertical and a horizontal component and wherein means are provided for varying the amplitude of the vibration imparted to the container.

17. Apparatus according to claim 14 wherein the conduit connections to the mixing chamber are at right angles to each other.

18. Apparatus according to claim 17 wherein the motion imparted to the container has both a vertical and a horizontal component.

19. In apparatus for cutting tooth structure by means of an abrasive-laden jet of gas, the combination of a nozzle, a source of compressed gas, a gas tight abrasive container having a storage compartment and a separate mixing chamber, a conduit connecting the gas source with the nozzle, said conduit including the mixing chamber, means for delivering abrasive from the storage compartment to the mixing chamber, and means for delivering compressed gas to the storage compartment at a point above the level of the abrasive.

20. Apparatus according to claim 19 wherein the said conduit is provided with a controlling valve located at a point between the mixing chamber and the nozzle.

21. Apparatus according to claim 19 wherein the said conduit is provided with a controlling valve located at a point between the mixing chamber and the nozzle, together with means for vibrating the container and also with means for actuating the valve, said last two means being arranged to function simultaneously.

22. In apparatus for cutting tooth structure by means of an abrasive-laden jet of gas, the combination of a source of compressed gas, an abrasive container having a storage compartment and a mixing chamber, a conduit connecting the gas source with the mixing chamber, means for delivering abrasive from the storage compartment to the mixing chamber at a rate lying between $0.3 \times 10^6$ to $3.0 \times 10^6$ particles per cubic inch of gas measured at atmospheric pressure, a nozzle, and a conduit for delivering the mixed gas and abrasive from the mixing chamber to the nozzle, the area of the discharge opening of said nozzle lying between .00015 and .00049 of a square inch.

23. Apparatus according to claim 22 wherein the storage compartment lies above the mixing chamber with a plate therebetween having perforations which are sufficiently small to prevent the abrasive from falling therethrough under conditions of rest and, further, where the means for delivering the abrasive from the storage compartment to the mixing chamber includes mechanism for vibrating the container whereby the particles are caused to pass through the perforations of said plate.

References Cited in the file of this patent

UNITED STATES PATENTS

| Number | Name | Date |
| --- | --- | --- |
| 1,664,369 | Maurer | Mar. 27, 1928 |
| 1,684,320 | Hermsdorf | Sept. 11, 1928 |
| 2,345,648 | Wolfskill | Apr. 4, 1944 |

FOREIGN PATENTS

| Number | Country | Date |
| --- | --- | --- |
| 430,111 | Germany | June 9, 1926 |